United States Patent
Taha et al.

(10) Patent No.: US 9,426,748 B2
(45) Date of Patent: Aug. 23, 2016

(54) DYNAMIC SLEEP MODE BASED UPON BATTERY CHARGE

(71) Applicant: QUALCOMM Incorporated, San Diego, CA (US)

(72) Inventors: Ali Taha, San Diego, CA (US); Hector Freires Corleto, Chandler, AZ (US); Rahul Kashyap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 14/329,790

(22) Filed: Jul. 11, 2014

(65) Prior Publication Data

US 2016/0014700 A1 Jan. 14, 2016

(51) Int. Cl.
*H04W 52/00* (2009.01)
*H04W 52/02* (2009.01)
*H02J 7/00* (2006.01)
*H02M 1/36* (2007.01)
*G06F 1/32* (2006.01)
*H02J 1/00* (2006.01)

(52) U.S. Cl.
CPC ............ *H04W 52/0277* (2013.01); *G06F 1/32* (2013.01); *H02J 1/00* (2013.01); *H02J 7/0063* (2013.01); *H02M 1/36* (2013.01); *H04W 52/0251* (2013.01); *H04W 52/0296* (2013.01); *H02J 2007/0067* (2013.01); *Y02B 60/50* (2013.01)

(58) Field of Classification Search
CPC ............ H04W 52/02; H04W 52/0274; H04W 52/0277; H04W 52/028
USPC .................................. 455/572, 574
See application file for complete search history.

(56) References Cited

U.S. PATENT DOCUMENTS

| | | | |
|---|---|---|---|
| 6,160,490 A * | 12/2000 | Pace ................. | H04W 52/0277 323/225 |
| 6,571,091 B1 * | 5/2003 | Janssen ............. | G01R 31/3648 455/127.1 |
| 7,535,119 B2 * | 5/2009 | Seo ................... | G06F 1/266 307/45 |
| 7,795,842 B2 * | 9/2010 | Sherman ............. | H02J 7/0031 320/132 |
| 7,928,715 B2 | 4/2011 | Shibata | |
| 8,074,086 B1 | 12/2011 | Sancheti et al. | |
| 8,395,518 B2 * | 3/2013 | Toba ................. | H04M 1/73 307/10.7 |
| 8,396,515 B2 * | 3/2013 | Sarker ............... | G06F 1/3225 455/127.3 |
| 8,607,036 B2 | 12/2013 | More et al. | |
| 2002/0028701 A1 * | 3/2002 | Satoh ................ | H04W 52/0277 455/574 |
| 2005/0064829 A1 * | 3/2005 | Kang ................ | H04W 52/028 455/127.1 |

(Continued)

FOREIGN PATENT DOCUMENTS

EP 1887450 A1 2/2008
KR 20000066073 A 11/2000

OTHER PUBLICATIONS

International Search Report and Written Opinion—PCT/US2015/031401—ISA/EPO—Oct. 23, 2015.

*Primary Examiner* — Wen Huang
(74) *Attorney, Agent, or Firm* — Haynes and Boone, LLP

(57) ABSTRACT

A power management technique is provided that operates with regard to a dynamic sleep threshold voltage. If a device's battery voltage is greater than the dynamic sleep threshold voltage, a voltage rail for the device is collapsed during a sleep mode for the device. Conversely, if the battery voltage is less than the dynamic sleep threshold voltage, the voltage rail is sourced during the sleep mode for the device.

20 Claims, 7 Drawing Sheets

(56) References Cited

U.S. PATENT DOCUMENTS

| | | | |
|---|---|---|---|
| 2005/0276132 A1* | 12/2005 | Severson | H03K 19/0016 365/202 |
| 2006/0069931 A1* | 3/2006 | Shin | G06F 1/3203 713/300 |
| 2006/0128445 A1* | 6/2006 | Kimata | H03F 1/0205 455/572 |
| 2007/0157036 A1 | 7/2007 | Jahagirdar et al. | |
| 2008/0057894 A1* | 3/2008 | Aleksic | H02J 9/002 455/187.1 |
| 2008/0058883 A1* | 3/2008 | Gautier | G06F 1/3203 607/29 |
| 2009/0098914 A1* | 4/2009 | Martin-Cocher | H04W 52/0261 455/572 |
| 2009/0119527 A1 | 5/2009 | Kim | |
| 2009/0235099 A1 | 9/2009 | Branover et al. | |
| 2009/0291634 A1* | 11/2009 | Saarisalo | H04M 1/72527 455/41.1 |
| 2010/0003950 A1* | 1/2010 | Ray | G10L 13/043 455/404.1 |
| 2010/0137023 A1* | 6/2010 | Chishima | H04W 52/0261 455/552.1 |
| 2010/0234075 A1* | 9/2010 | Chishima | H04B 1/406 455/566 |
| 2010/0321102 A1* | 12/2010 | Kong | H03K 19/0016 327/544 |
| 2011/0312385 A1* | 12/2011 | Lee | H04W 52/0277 455/566 |
| 2012/0058805 A1* | 3/2012 | Yoo | H04M 1/72536 455/574 |
| 2012/0108224 A1* | 5/2012 | Cheng | H04W 52/0277 455/418 |
| 2012/0179300 A1* | 7/2012 | Warren | F24F 11/0012 700/278 |
| 2012/0200345 A1 | 8/2012 | Kim | |
| 2013/0031388 A1 | 1/2013 | Sakarda | |
| 2014/0235301 A1* | 8/2014 | Segev | H02M 3/00 455/574 |
| 2015/0033049 A1* | 1/2015 | Zhao | H04M 1/2745 713/320 |
| 2015/0119094 A1* | 4/2015 | Bartels | H04W 52/0261 455/518 |
| 2015/0282091 A1* | 10/2015 | Lin | H04W 52/0258 455/552.1 |

* cited by examiner

DYNAMIC SLEEP MODE BASED UPON BATTERY CHARGE

TECHNICAL FIELD

This application relates to power management, and more particularly to devices having dynamic sleep modes based upon battery voltage.

BACKGROUND

As the battery charge depletes during use of a battery-powered device, the corresponding battery voltage decreases. At some point, the battery voltage becomes unacceptably low as the battery is discharged such that the device powers down. For example, it is conventional for a handset to power down if the battery voltage drops below a software cutoff threshold voltage such as 3.5 V. The device is then unusable until the battery is recharged. Because consumers demand extended use times, it is desirable to delay the device shutdown as long as possible.

Within a mobile device, the battery may power numerous different power rails that supply corresponding power domains. Each power rail is sourced by a corresponding power regulator such as a low dropout regulator. The devices typically include a power management integrated circuit (PMIC) to manage the power regulators for the various power rails. To extend battery life, it is conventional for the PMIC to power down assorted ones of the power rails while the device is in a standby or sleep mode. For example, when not in use, a mobile telephone is predominately in an idle standby (sleep) mode. The mobile telephone will then wake up periodically according to its discontinuous receive (DRX) cycle to cheek for messages or calls. When in sleep mode, unnecessary power rails are typically powered down to extend battery life. If a power rail is instead sourced during the sleep mode, transistors and other devices coupled to the power rail will conduct leakage current that unnecessarily discharges the battery.

Although modern power management techniques increase operating times, there is a need in the art for additional battery life.

SUMMARY

A device is provided that has both a sleep mode of operation and an active mode of operation. In the sleep mode, a power rail for the device is controlled differently depending upon a battery voltage as compared to a dynamic sleep threshold voltage. If the battery voltage exceeds the dynamic sleep threshold voltage, a power regulator for the power rail is shut off during the sleep mode so that a voltage for the power rail collapses (the voltage goes to ground). Conversely, the power regulator sources the power rail during the sleep mode if the battery voltage is less than the dynamic sleep threshold voltage. Although it is counter-intuitive to maintain the power rail voltage despite the battery nearing depletion, the resulting loss of power from leakage currents from the sourced power rail during the sleep mode is overshadowed by the extended operating life of the device with regard to a software cutoff threshold voltage for the battery. In that regard, it is routine for a device to shut down if the battery voltage drops below the software cutoff threshold voltage to protect the device from malfunction or damage from the reduced battery voltage. But this shut down is delayed for the devices disclosed herein with regard to conventional operation by sourcing the power rail to maintain a power supply voltage during the sleep mode if the battery voltage has dropped below the dynamic sleep threshold voltage.

During the sleep mode, the power rail is sourced to at least a voltage sufficient for a low-voltage mode of operation such as a voltage sufficient to maintain states such as SRAM memory states if the battery voltage is below the dynamic sleep threshold voltage. Because of this preexisting voltage on the power rail, the battery will not have to supply a surge of current (inrush current) that would otherwise occur upon the sourcing of a power rail from its collapsed state as the device transitions from the sleep mode to active operation. It is this current surge that would conventionally pull the battery voltage below the software cutoff threshold voltage that then triggers a shutdown of the device despite sufficient charge remaining in the battery for continued operation. The dynamic power management techniques disclosed herein advantageously exploits this remaining charge to obtain extended operating times for the device.

These and other advantageous features may be better appreciated through the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A power management technique is disclosed that extends operating time for battery-powered devices without requiring any changes to the existing battery. In this power management technique, power rails are managed with regard to a dynamic sleep threshold voltage. This technique is applied to devices including an integrated circuit such as a system-on-a-chip (SOC) that have one or more power domains that may be independently powered down in corresponding sleep modes. Each power domain may correspond to its own power regulator such as a linear dropout regulator (LDO) that powers the voltage rail or rails for the power domain. As defined herein, the terms "power rail" and "voltage rail" are used interchangeably. If a battery voltage for a device including a power domain about to transition into a sleep mode is above the dynamic sleep threshold voltage, the corresponding power regulator may be shut down so that the power rail for the power domain collapses during the sleep mode. Conversely, if the battery voltage is below the dynamic sleep threshold voltage, the power regulator for the power domain transitioning into the sleep mode continues to maintain at least a reduced voltage on the power rail. For example, the reduced voltage may be sufficient to maintain state for memories in the power domain during the sleep mode. The sleep mode is thus dynamic in that the power rail in the sleep mode is collapsed if the battery voltage is above the dynamic sleep threshold voltage and is not collapsed if the battery voltage is below the dynamic sleep threshold voltage.

In addition, some of the power regulators may be allowed to collapse their power rails in the power management technique disclosed herein but use a slower voltage stepping rate with regard to sourcing their rails while transitioning from the sleep mode back into an active mode if the battery voltage is below the dynamic sleep threshold voltage. In contrast, if the battery voltage is above the dynamic sleep threshold voltage, a faster voltage stepping rate may be used to boost the power supply voltage on the corresponding power rail when transitioning from the sleep mode to an active mode of operation.

Figure 1:
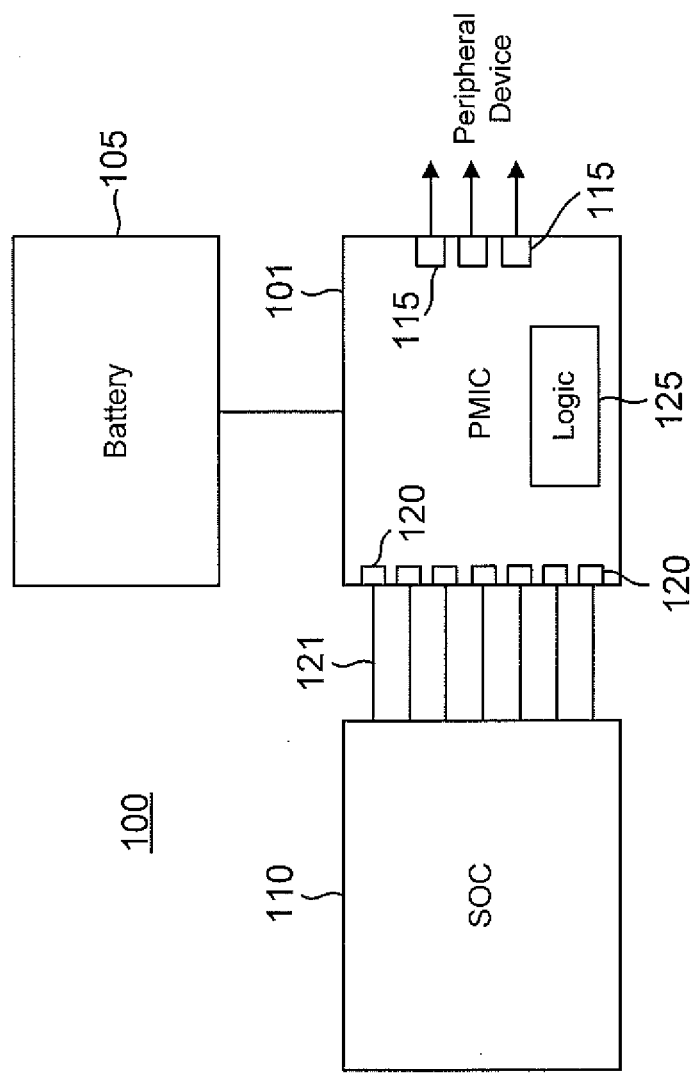
FIG. 1 is a block diagram of an example electronic system configured to perform power management techniques in accordance with an embodiment of the disclosure.

An example system 100 is shown in FIG. 1 that is configured to practice an embodiment of the power management technique disclosed herein. An SOC 110 in system 100 includes a plurality of independent power domains each powered by at least one corresponding power rail 121. A power management integrated circuit (PMIC) 101 manages the voltage and power sequencing of the various power rails 121. To provide this power management, PMIC 101 includes a logic circuit 125 that is configured to manage the desired power sequencing and voltage levels. PMIC 101 not only manages the power domains in SOC 110 but may also manage the power for a number of peripheral devices (not illustrated) such as a display, a speaker driver, a USB interface, and so on. To regulate the power for the power rails 121 as well as the peripheral devices, PMIC 101 may include corresponding low dropout (LDO) regulators 120 as well as switching power regulators such as buck regulators 115. Regulators 120 and 115 derive their power from a battery 105. Logic circuit 125 monitors a battery voltage for battery 105 with regard to a dynamic sleep threshold voltage. This dynamic sleep threshold voltage determines the dynamic nature of the sleep modes implemented by logic circuit 125. In one embodiment, if a power domain in SOC 110 is to be transitioned into a sleep mode and the battery voltage exceeds the dynamic sleep threshold voltage, logic circuit 125 may shut down the corresponding LDO regulator 120 so that the voltage on its power rail 121 collapses (discharges to ground). But if the battery voltage is less than the dynamic sleep threshold voltage, logic circuit 125 maintains the corresponding LDO regulator 120 in at least a low voltage mode to keep its power rail 121 sourced so as to carry a power supply voltage.

In one embodiment, PMIC 101 may be deemed to comprise a means for managing a first power rail so that the first power rail is collapsed during a sleep mode for an SOC when a battery voltage for a battery supplying the SOC is greater than a dynamic sleep threshold voltage and so that the first power rail is sourced during the sleep mode for the SOC when the battery voltage is less than the dynamic sleep threshold voltage. As used herein, a voltage rail is deemed to be "sourced" when its voltage is maintained by a power regulator at a power supply voltage level.

Figure 2A:
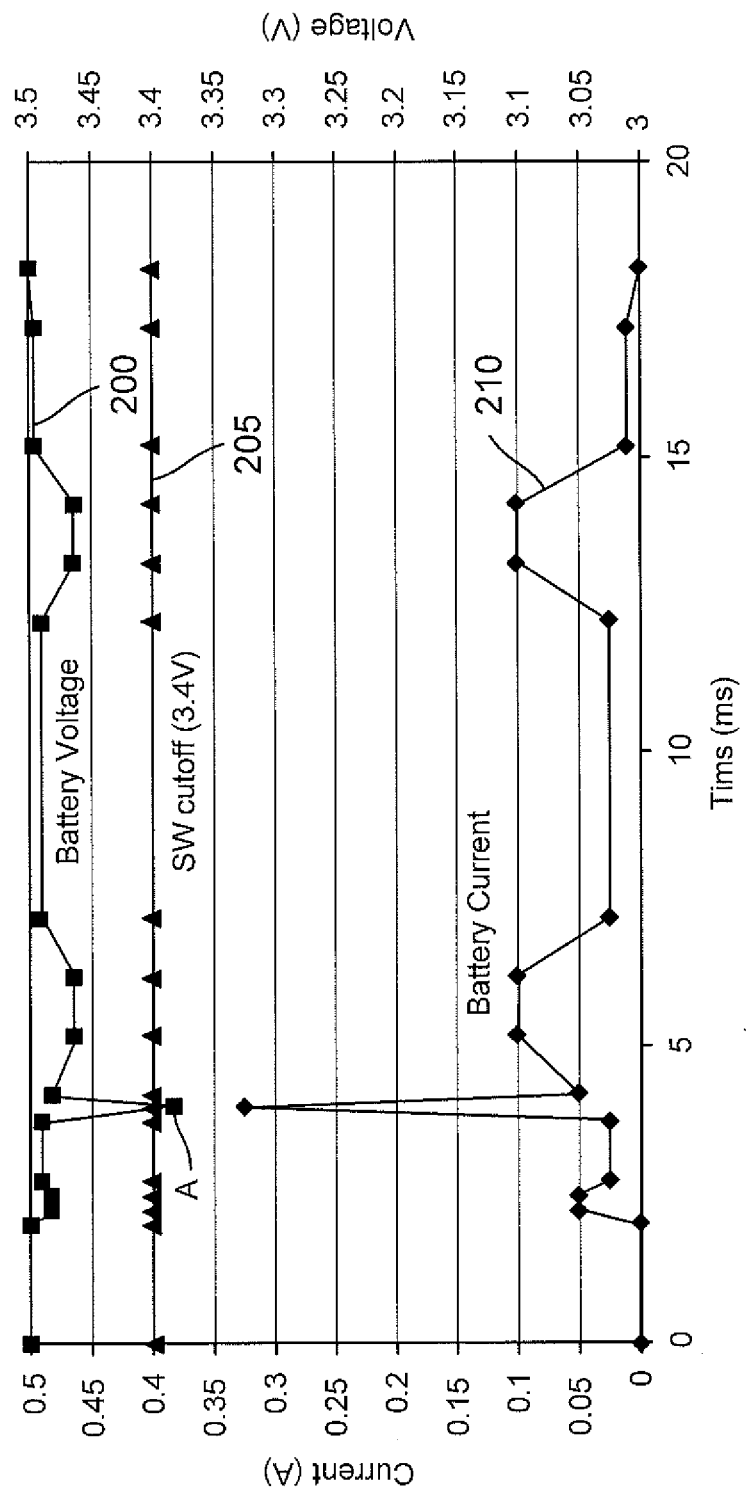
FIG. 2A illustrates the battery voltage, a cutoff threshold voltage, and battery current for a conventional recovery from a sleep mode.
Figure 2B:
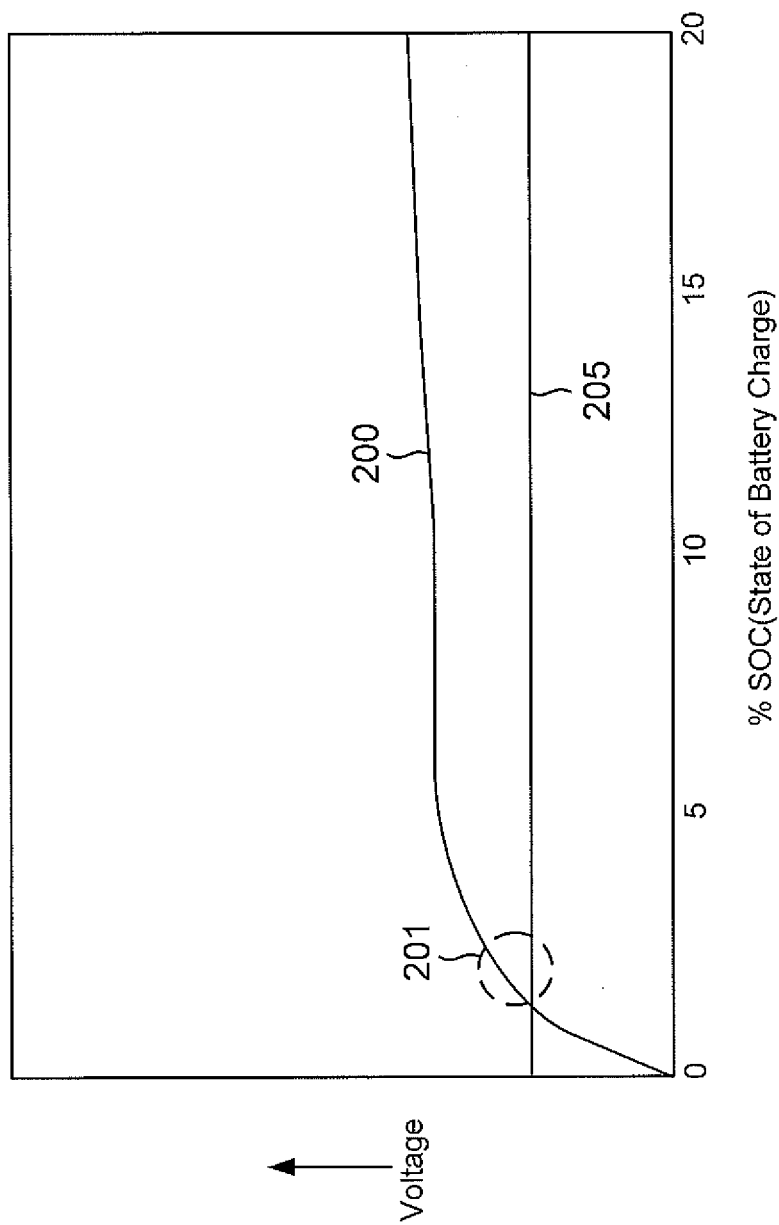
FIG. 2B illustrates the battery voltage versus charge remaining for a conventional mobile device battery.

The advantages of using a dynamic sleep threshold voltage may be better appreciated with reference to FIG. 2A, which illustrates the currents and voltages involved for a transition from a conventional sleep mode. A battery voltage 200 prior to the mode transition is above a cutoff threshold voltage 205, which may be determined by software or by hardware. If the corresponding PMIC determines that battery voltage 200 is less than cutoff threshold voltage 205, it shuts down the power regulators for supplying the power rails to an SOC or ASIC to prevent any damage and malfunction in the SOC or ASIC. A battery current 210 is negligible (e.g., 1 milli-amp) prior to the transition from the sleep mode. At around 4 milliseconds, a large spike is evident in the battery current 210, which is a phenomenon denoted as inrush current as the corresponding power rail is sourced (voltage increased to a power supply voltage level) from its collapsed state. Such an inrush current is problematic as the battery charge depletes. In particular, as shown in FIG. 2B, battery voltage 200 drops as the percentage of charge remaining in the battery is depleted. At the same time, the internal resistance of the battery rises as well. There is thus a region 201 in which inrush-current-induced dips in battery voltage 200 may trigger a software-controlled shutdown of the corresponding device. Such shutdowns will be triggered even more frequently at lower temperatures due to a corresponding increase in the internal resistance of the battery. Regardless of the temperature, a shutdown would then occur for the corresponding device if battery voltage 200 dips below cutoff threshold voltage 205. Referring again to FIG. 2A, such a shutdown occurs at point A for battery voltage 200 as a result of the ohmic drop due to the internal battery resistance multiplied by the inrush-current-increased battery current 210. But as shown in region 201 of FIG. 2B, there is still a portion (e.g. 2%) of available charge left in the battery despite the software-controlled shutdown.

Figure 2C:
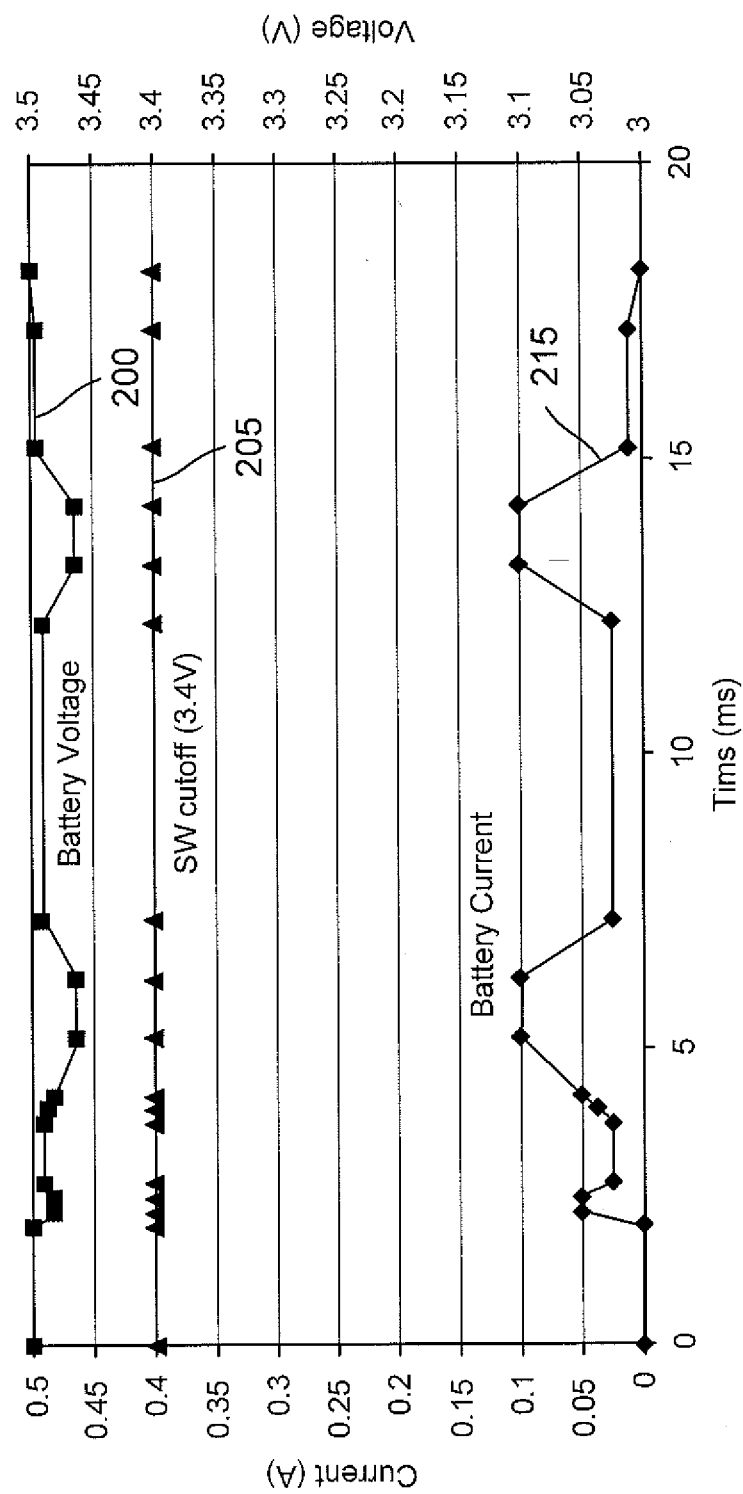
FIG. 2C illustrates the battery voltage, cutoff threshold voltage, and battery current for a recovery from a dynamic sleep mode in accordance with an embodiment of the disclosure.

By dynamically altering the sleep mode, the disclosed power management technique advantageously utilizes this remaining portion of the battery charge that would conventionally be unavailable due to the cutoff threshold voltage issue. A resulting battery current 215 is shown in FIG. 2C for a wakeup from a dynamic sleep mode. In this dynamic sleep mode, the corresponding voltage rail would be collapsed if battery voltage 200 were above the dynamic sleep threshold voltage, which in this embodiment is 3.5V. Because battery voltage 200 drops below the dynamic sleep threshold, the corresponding voltage rail is not collapsed but instead is maintained in a low voltage mode by the corresponding LDO regulator. There is thus no in-rush current as the sleep mode transitions to an active or awake mode. Battery voltage 200 then remains above the cutoff threshold voltage 205 (which in one embodiment equals 3.4 V) so that the device never shuts down but instead may continue to operate.

As discussed above with regard to region 201 of FIG. 2B, there is generally just a few percent of the overall battery charge that can then be utilized in addition to what would be discharged in a conventional sleep mode. But such a relatively minor portion of the total available battery charge is actually quite significant. For example, a conventional cellular telephone battery may have in the range of 2000 to 3100 mill-amp hours (mAh) of total charge storage. Two percent of such total charge storage equates to approximately 40 to 62 mAh of charge for additional battery life. Sleep mode power usage is typically 1.4 to 2.5 mAh such that the extra 2% then provides 29 to 25 hours of extra idle standby time. Translating this charge into more practical terms, the average days of use (DoU) current for a mobile telephone taking into account normal usage patterns is around 40 to 50 mA. The charge conservation techniques disclosed herein thus provide another 1.1 to 1.2 hours of normal usage (as opposed to just leaving the phone in standby mode without using it). This is a substantial increase in battery life without requiring any changes to the battery. In that regard, it is a relatively straightforward proposition to increase battery life by increasing the size of the battery. But such a size increase then defeats a compact device footprint. The power management techniques disclosed herein effectively provides the user with a larger battery without requiring any actual increase in battery size or cost.

The dynamic sleep mode is counter-intuitive in that one would expect that the collapsing of power rails would be enforced even more vigorously as battery charge is depleted. When a power rail is collapsed, there can be no leakage current from such a power rail and thus there is no drain on the battery. In contrast, if a power rail is maintained even in a reduced voltage state in the sleep mode, there will be some leakage current loss. But this loss is acceptable in that it is dominated by the increased hours of normal usage that are enabled as discussed above. Note that some power rails may still be collapsed despite the implementation of a dynamic sleep mode. For example, it may be assumed that the user is aware of the precarious state of the battery charge as it becomes diminished in that it is routine for mobile devices to include a display of remaining battery life. The user will thus not have expectations of using power-hungry modes of operation at such times such as playing of music through the loudspeaker(s) or video gaming. Power rails that correspond to the circuitry for driving these optional modes of operation may be collapsed even though the battery voltage has decreased below the dynamic voltage threshold. Conversely, power rails for circuitry involved with basic functions such as for voice calls are maintained in a low-voltage state during the sleep mode. Alternatively, these rails may be maintained at an active voltage that is higher than that used for the low-voltage state.

Figure 3A:
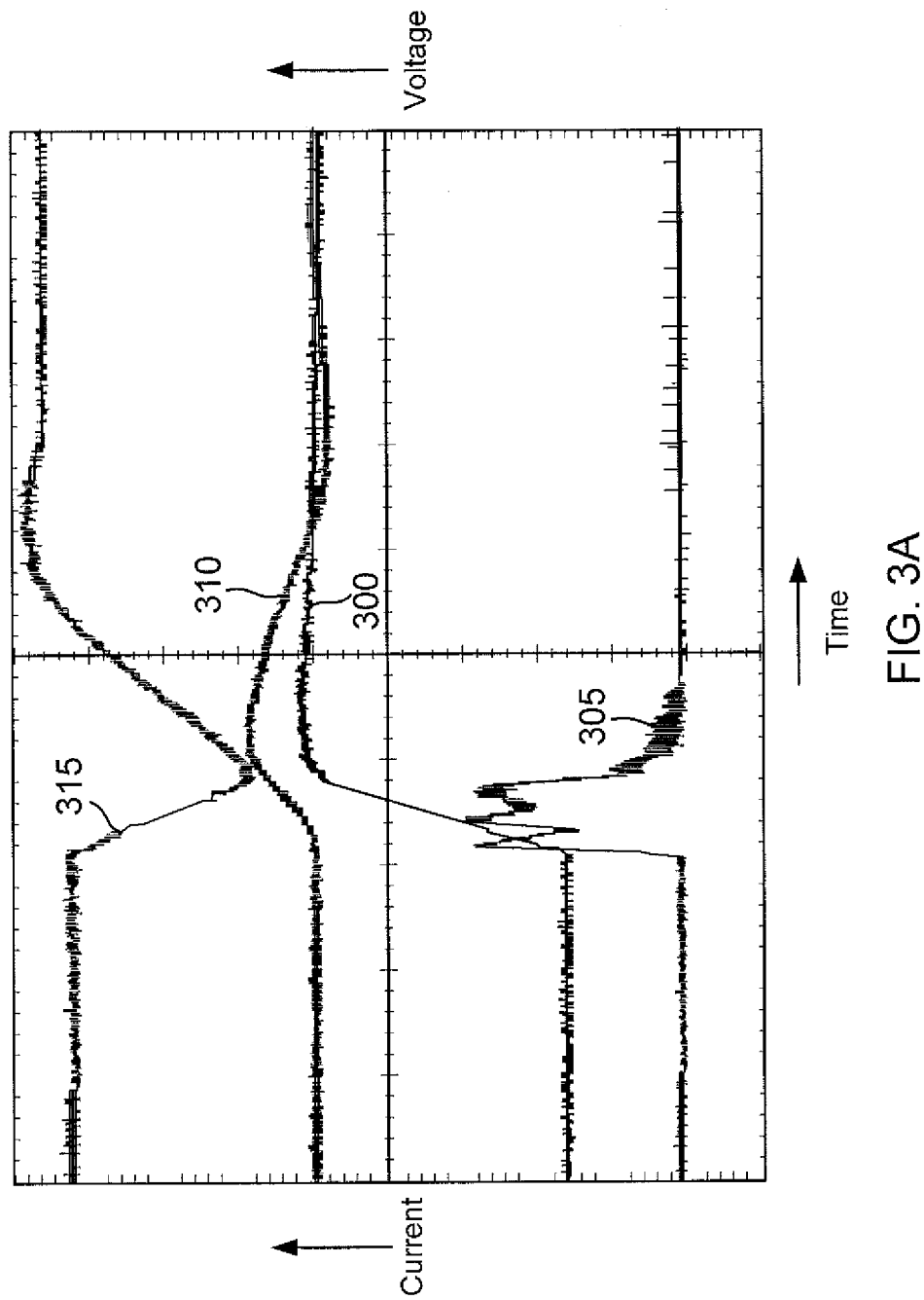
FIG. 3A illustrates the battery voltage, rail voltage, buck inductor current, and battery current for a recovery from a conventional sleep mode.
Figure 3B:
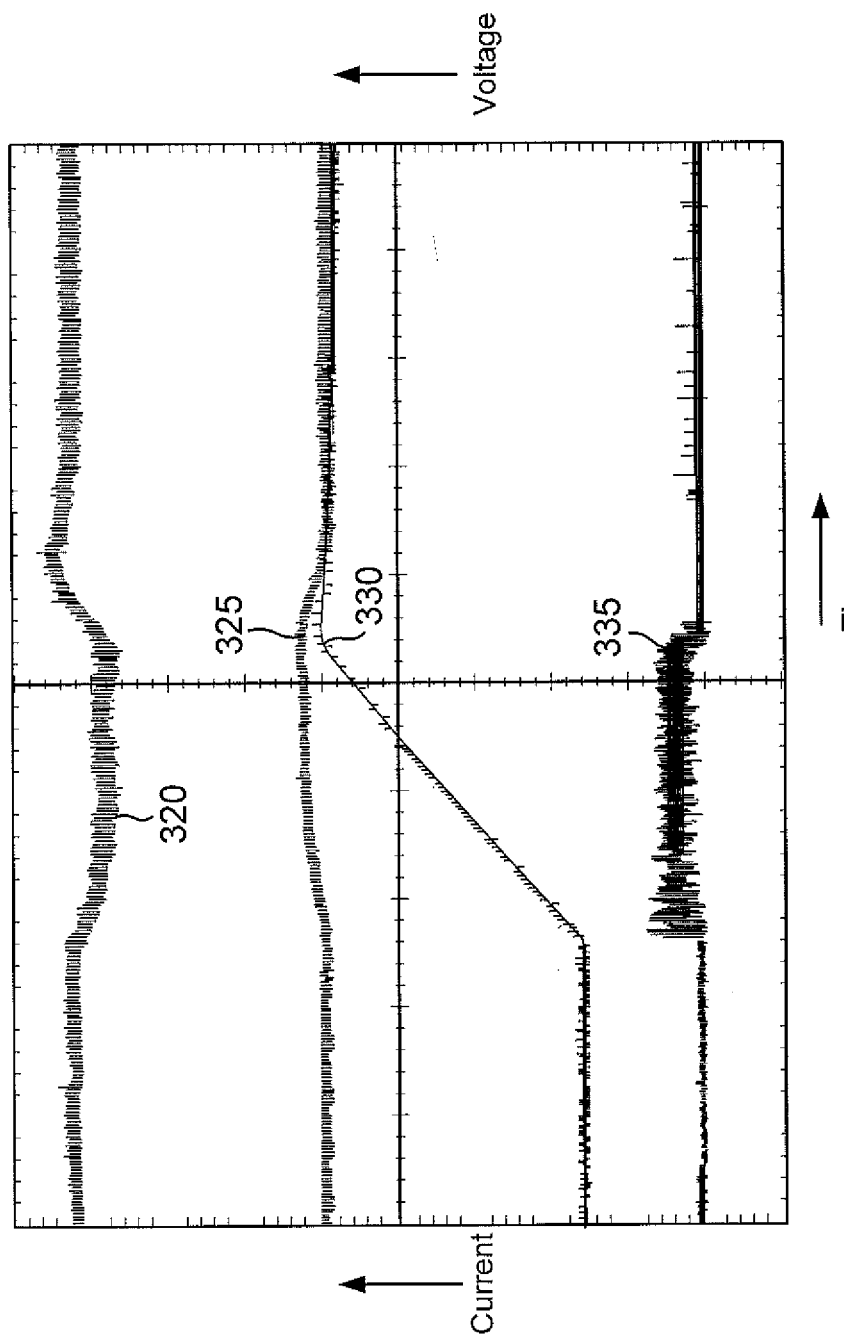
FIG. 3B illustrates the battery voltage, rail voltage, buck inductor current, and battery current for a dynamic voltage stepper rate recovery from a sleep mode in accordance with an embodiment of the disclosure.

In addition to the dynamic sleep mode, the power regulators may be controlled to implement a dynamic voltage stepping or ramping of their corresponding power rails. For a wakeup from a sleep mode when the battery voltage is greater than the dynamic sleep threshold voltage, the power regulators may be controlled to step the voltage on their rails at a normal rate. For example, a power rail voltage 300 shown in FIG. 3A is ramped at the normal rate during a wakeup of a corresponding power domain from a dynamic sleep mode when a battery voltage 315 is greater than a dynamic sleep threshold voltage. Such a relatively fast stepping of power rail voltage 300 produces a corresponding large spike in a buck inductor current 305 for the corresponding power regulator. A battery current 310 increases significantly due to the spike in buck inductor current 305. Due to the internal resistance of the battery, battery voltage 315 drops accordingly from the increase in battery current 310. In contrast, a lower voltage stepping rate is shown in FIG. 3B for a power rail voltage 330 waking up out of the sleep mode when a battery voltage 320 is less than the dynamic sleep threshold. Due to the lower voltage stepping rate, a buck inductor current 335 has a markedly lower increase in current as compared to buck inductor current 305 of FIG. 3A. A battery current 325 thus has a very mild increase such that despite the internal resistance of the battery, battery voltage 320 has a corresponding minor dip during the ramping up of power rail voltage 330. In one embodiment, the faster voltage stepping rate may be 40 millivolts per micro second whereas the slower voltage stepping rate may be 5 millivolts per micro second. It will be appreciated that this slowing of the voltage stepping rate may be applied to collapsed non-essential power rails when the battery voltage dips below the dynamic sleep threshold voltage should these non-essential power rails become necessary during a subsequent wakeup of the device. For example, a user may need to briefly web browse during a voice call. The power rails for voice call function were not collapsed as discussed previously. The non-essential power rails may then be powered up at the reduced stepping rate to prevent a software-controlled shutdown when the battery voltage is lower than the dynamic sleep threshold voltage. A method of operation for a power management technique using a dynamic sleep threshold voltage will now be discussed.

Figure 4:
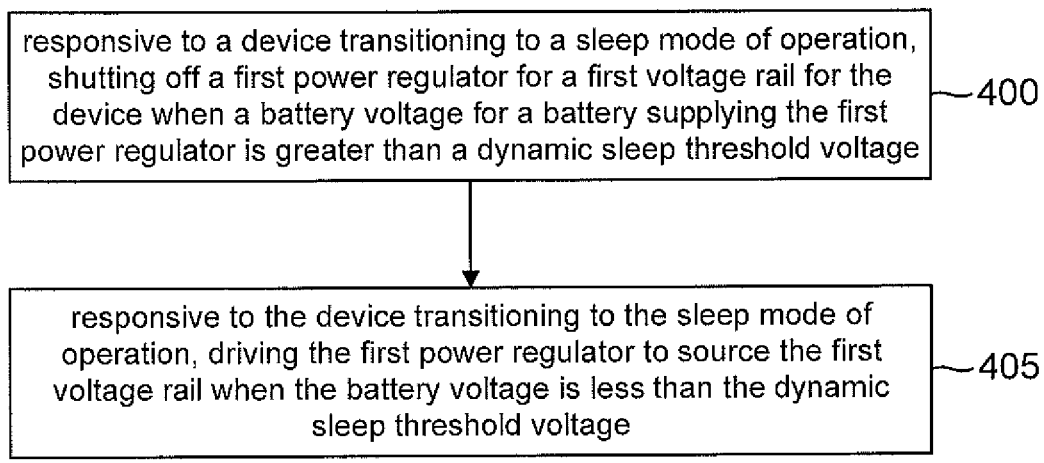
FIG. 4 is a flowchart of an example method of operation in accordance with an embodiment of the disclosure.

FIG. 4 is a flowchart for an example method of operation. This method may be managed by logic circuit 125 in PMIC 101 of FIG. 1 for a device such as SOC 110 and its power rails 121. An act 400 is responsive to a device transitioning to a sleep mode of operation and comprises shutting off a first power regulator for a first voltage rail for the device when a battery voltage for a battery supplying the first power regulator is greater than a dynamic sleep threshold voltage. An example of act 400 is the shutting down of an LDO 120 that sources a corresponding power rail 121 for SOC 110 of FIG. 1 while the battery voltage is greater than the dynamic sleep threshold voltage. An act 405 is responsive to the device transitioning to the sleep mode of operation and comprises driving the first power regulator to source the first voltage rail when the battery voltage is less than the dynamic sleep threshold voltage. Such a powered-on state may comprise sourcing the voltage rail to an active voltage such as used during the reading and writing of memories or instead to a reduced voltage such as used in an idle retention mode of operation. The operation of LDO 120 to keep its corresponding power rail 121 sourced while SOC 110 is in the sleep mode and while the battery voltage is less than the dynamic sleep threshold is an example of act 405.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A power management integrated circuit (PMIC), comprising:
   a first power regulator; and
   a control logic circuit configured to control the first power regulator to source a corresponding power rail while a battery voltage is less than a dynamic sleep threshold voltage when a device powered by the corresponding power rail is in the sleep mode and to power collapse the corresponding power rail while the battery voltage is greater than the dynamic sleep threshold voltage when the device is in the sleep mode.

2. The PMIC of claim 1, wherein the first power regulator comprises a plurality of first power regulators.

3. The PMIC of claim 1, wherein the first power regulator comprises a linear dropout regulator.

4. The PMIC of claim 1, wherein the first power regulator comprises a switching power regulator.

5. The PMIC of claim 4, wherein the switching power regulator comprises a buck converter.

6. The PMIC of claim 1, further comprising:
   a second power regulator configured to source a second power rail for the device, wherein the control logic circuit is further configured to control the second power regulator to source the second power rail according to a first voltage stepping rate while the battery voltage is greater than the dynamic sleep threshold voltage when the device transitions from the sleep mode to an active mode and to source the second power rail according to a second voltage stepping rate while the battery voltage is less than the dynamic sleep threshold voltage when the device transitions from the sleep mode to the active mode, and wherein the first voltage stepping rate is greater than the second voltage stepping rate.

7. The PMIC of claim 6, wherein the first voltage stepping rate is approximately 40 millivolts per microsecond and the second voltage stepping rate is approximately 5 millivolts per microsecond.

8. The PMIC of claim 1, wherein the dynamic sleep threshold is approximately 3.5 volts.

9. The PMIC of claim 1, further comprising a second power regulator configured to source a second power rail for the device, wherein the control logic circuit is configured to control the second power regulator independently from the dynamic sleep threshold voltage.

10. A method, comprising:
responsive to a device transitioning to a sleep mode of operation, shutting off a first power regulator for a first voltage rail for the device when a battery voltage for a battery supplying the first power regulator is greater than a dynamic sleep threshold voltage; and
responsive to the device transitioning to the sleep mode of operation, driving the first power regulator to source the first voltage rail when the battery voltage is less than the dynamic sleep threshold voltage.

11. The method of claim 10, wherein shutting off a first power regulator comprises shutting off a linear dropout regulator.

12. The method of claim 10, wherein driving the power regulator comprises driving the power regulator to source the voltage rail to a voltage that is less than an active mode of operation voltage for the device.

13. The method of claim 12, further comprising:
responsive to the device transitioning from the sleep mode to an active mode of operation, sourcing a second voltage rail for the device according to a first voltage stepping rate when the battery voltage is greater than the dynamic sleep threshold voltage.

14. The method of claim 13, further comprising:
responsive to the device transitioning from the sleep mode to the active mode of operation, sourcing the second voltage rail for the device according to a second voltage stepping rate when the battery voltage is less than the dynamic sleep threshold voltage, wherein the second voltage stepping rate is less than the first voltage stepping rate.

15. The method of claim 10, wherein the device is a cellular telephone, the method further comprising:
responsive to the cellular telephone transitioning to a sleep mode of operation when the battery voltage is less than the dynamic sleep threshold voltage, shutting off a second power regulator for a second voltage rail, wherein the second voltage rail supplies circuitry in the cellular telephone that is not essential for supporting voice calls and wherein the first voltage rail supplies circuitry in the cellular telephone that is essential for supporting voice calls.

16. A system, comprising:
a battery;
a system-on-a-chip (SOC) including at least a first power domain supplied by a first power rail; and
means for managing the first power rail so that the first power rail is collapsed during a sleep mode for the SOC when a battery voltage for the battery is greater than a dynamic sleep threshold voltage and so that the first power rail is sourced during the sleep mode for the SOC when the battery voltage is less than the dynamic sleep threshold voltage.

17. The system of claim 16, wherein the SOC further includes a second power domain supplied by a second power rail, and wherein the means for managing the first power rail is further configured to manage the second power rail so that the second power rail is collapsed during the sleep mode for the SOC regardless of a magnitude for the battery voltage with regard to the dynamic sleep threshold voltage.

18. The system of claim 16, wherein the SOC is configured to shut down if the battery voltage is less than a cutoff threshold voltage.

19. The system of claim 17, wherein the cutoff threshold voltage is approximately 3.4 volts and the dynamic sleep threshold is approximately 3.5 volts.

20. The system of claim 16, wherein the system comprises a cellular telephone.

* * * * *